United States Patent [19]

Uesugi et al.

[11] Patent Number: 4,874,955
[45] Date of Patent: Oct. 17, 1989

[54] METHOD AND APPARATUS FOR MEASURING A THREE-DIMENSIONAL CURVED SURFACE SHAPE

[75] Inventors: Mitsuaki Uesugi; Masaichi Inomata; Isamu Komine, all of Kanagawa, Japan

[73] Assignee: NKK Corporation, Tokyo, Japan

[21] Appl. No.: 258,603

[22] Filed: Oct. 17, 1988

[30] Foreign Application Priority Data

May 17, 1988 [JP] Japan .............................. 63-118201

[51] Int. Cl.$^4$ ............................................. G02B 27/42
[52] U.S. Cl. .................................... 250/550; 250/560; 356/376; 350/509
[58] Field of Search ....................... 250/560, 561, 550; 356/374, 376; 350/509, 510

[56] References Cited

U.S. PATENT DOCUMENTS 4,668,094  5/1987  Matsumoto et al. ................. 356/376
4,744,660  5/1988  Noguchi et al. ..................... 350/509
4,794,550  12/1988 Greivenkamp ...................... 250/550

FOREIGN PATENT DOCUMENTS 60-11106 1/1985 Japan .

OTHER PUBLICATIONS

"Fundamental Study of Application of Light to Measurement" (published by Society for Automatic Control of Measurement) pp. 171-172.

Primary Examiner—David C. Nelms
Attorney, Agent, or Firm—Michael N. Meller

[57] ABSTRACT

A method and apparatus adapted to measure a three-dimensional curved surface shape quantitatively with high speed. A pattern of interference fringes on a surface of an object to be measured is picked up so that while moving a reference plane (or the object to be measured) in the direction of an optical axis, the resulting video signal is processed to form a composite image in which a value of each of picture elements is represented by a position of the reference plane (or a position of the object to be measured) at an instant that one of positions on the object surface corresponding to that picture element in the image attains a maximum brightness. Then, a three-dimensional curved surface shape of the object to be measured is measured on the basis of the composite image.

5 Claims, 7 Drawing Sheets

METHOD AND APPARATUS FOR MEASURING A THREE-DIMENSIONAL CURVED SURFACE SHAPE

BACKGROUND OF THE INVENTION

The present invention relates to a method and apparatus for measuring three-dimensional curved surface shape by means of the interference of light.

The methods of observing shapes by use of the interference of light have been known from olden times as effective methods of observing the fine irregularities on an object to be measured in the form of a Pattern. In particular, a so-called interference microscope combining an interferometer and a microscope has been widely used for example as shape measuring means (foremost position measuring means) for measuring the formed end of a magnetic head to adjust its mounting position during the assembling of the magnetic head on the cylinder of a VTR.

Figure 1:
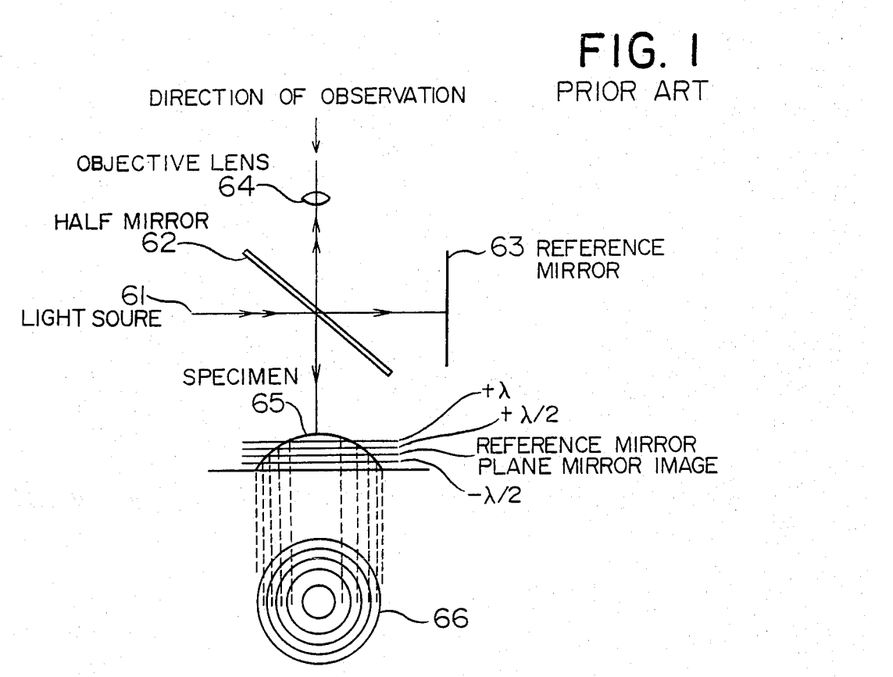
FIG. 1 is a schematic diagram for explaining the principle of an interference microscope.

There have been known a number of types of interference microscopes including for example the Michelson type, Linnik type, Tolansky type, Mirau type, etc. as shown, for example, in page 171 of FUNDAMENTAL STUDY OF APPLICATION OF LIGHT TO MEASUREMENT (published by Society for Automatic Control of Measurement) and their measuring principles are all equivalent to the one shown in FIG. 1.

In FIG. 1, numeral 61 designates a light source, 62 a half mirror, 63 a reference mirror, 64 an objective lens, and 65 an object to be measured.

As shown in FIG. 1, this measuring principle notes a phenomenon that due to the interference between the reflected light from the surface of the object 65 to be measured and the reflected light from the reference mirror 63, those portions where the differences in light path length between the light beams are even multiples of $\lambda/2$ ($\lambda$ is the wavelength of light) become light and the other portions of odd multiples of $\lambda/2$ become dark thereby developing on the surface of the object to be measured contour fringes 66 of a $\lambda/2$ pitch (the differences in light path length have the effects of two times the amounts of the irregularities in the surface of the object).

While such interference microscope is suitable for generally and intuitively looking down upon the overall shape of the object to be measured, to quantitatively grasp the shape gives rise to the following problems and therefore the application of such interference microscope to the actual shape measurements is difficult.

(1) To determine the height of a certain point requires that the number of fringes from a reference point be counted one by one thus requiring a huge amount of image processing.

(2) While the relative displacement between two points can be determined by counting the number of fringes, which one of the two is higher than the other cannot be determined due to the lack of information.

(3) It is difficult to measure the height of any shape having stepwise differences in level, since this makes it impossible to recognize the connection of the fringes.

(4) Where there are considerable variations in the surface reflectance of an object to be measured or in the case of an object having irregularities greater than the coherent distance of light, the interference fringes are deteriorated in contrast and it is difficult to extract the interference fringes thus making it sometimes impossible to make the measurement.

On the other hand, proposals have been made to more quantitatively measure the shape of an object to be measured to overcome the foregoing difficulties.

Figure 2:
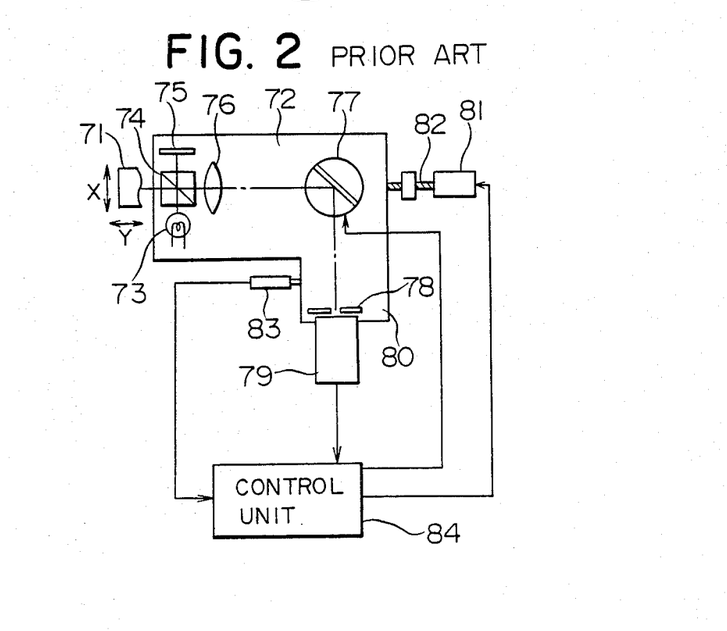
FIG. 2 is a block diagram showing a conventional three-dimensional curved surface shape measuring apparatus.

One such proposed method is disclosed in Japanese Laid-Open Pat. No. 60-11106. FIG. 2 shows the method disclosed in this Laid-Open Pat. No. 60-11106. In the Figure, numeral 71 designates an object to be measured, 72 a microscope, 73 a light source, 74 a beam splitter, 75 a reference light mirror, 77 a galvano-mirror, 78 a slit, and 79 a photomultiplier tube. Numeral 80 designates a table, 81 a motor, and 82 a feed screw.

In this method, noting the fact that where the light source of an interference microscope is one which is interior in coherency or a light source having a narrow coherent range the interference fringes become maximum in contrast when the distance from the light source 73 to the object to be measured is equal to the distance from the light source 73 to the reference light mirror 75, the distance between the microscope 72 and the object 71 to be measured is varied through the movement of the table 80 while observing the reflected light intensity of any given point on the surface of the object 71. Then, by detecting the relative positions of the object 71 and the microscope 72 when the peak value for each period of the interference fringe light and dark level values assumes the maximum value, the height of the given point is measured. Thus, while shifting the measuring point from one to another by means of the galvano-mirror 77, the above-mentioned measurement is repeated thereby measuring the entire shape of the object 71.

While this method is advantageous in terms of the quantitative property of measurements, basically the measurements, basically the measurement is made point by point thus requiring much time for the measurements and in reality it is difficult to measure the three-dimensional profile of the surface of an object to be measured with a high degree of spatial resolution.

SUMMARY OF THE INVENTION

It is an object of the present invention to provide a method and apparatus for measuring a three-dimensional curved surface shape quantitatively with high speed.

In accordance with the invention, while picking up the pattern of interference fringes on the surface of an object to be measured and moving a reference plane (or the object to be measured) in the direction of an optical axis, the resulting video signal is processed to form a composite image in which the value of each of picture elements in the image is represented by the position of the reference plane (or the position of the object to be measurement) at the instant that the point on the object surface corresponding to that picture element has the maximum brightness. Then, the three-dimensional curved surface shape of the object to be measured is measured in accordance with the composite image.

As a result, the three-dimensional profile of an object to be measured can be measured in the form of a pattern by a single scanning of the reference plane (or the object to be measured) in the direction of the optical axis, with the result that if, for example, a television camera is employed as image pickup means, the three-dimensional profile of the object surface can be measured quantitatively in high speed with a resolution corresponding to the spatial resolution of the television camera.

It is to be noted that in interference fringe generating microscope is used for example as a means of generating interference fringes and its light source comprises one which is poor in coherence property.

DESCRIPTION OF THE PREFERRED EMBODIMENT

Figure 3A:
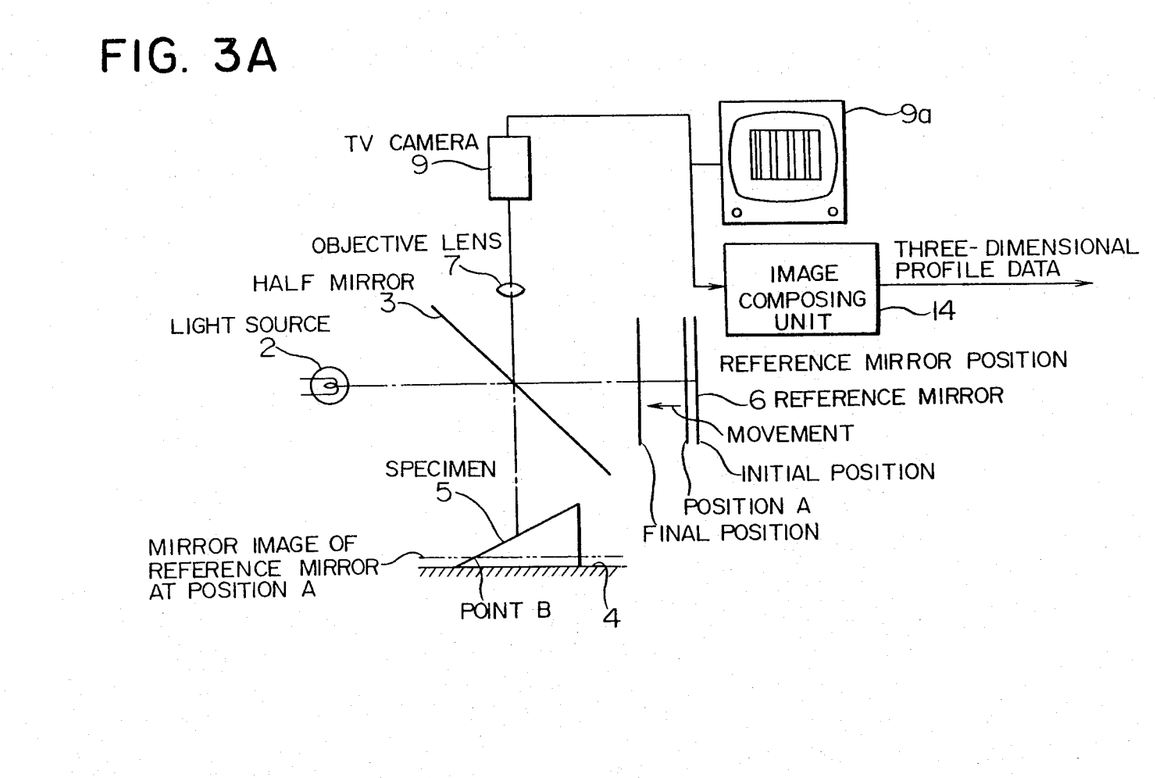
FIG. 3A is a schematic diagram for explaining the measuring principle of the present invention.
Figure 3B:
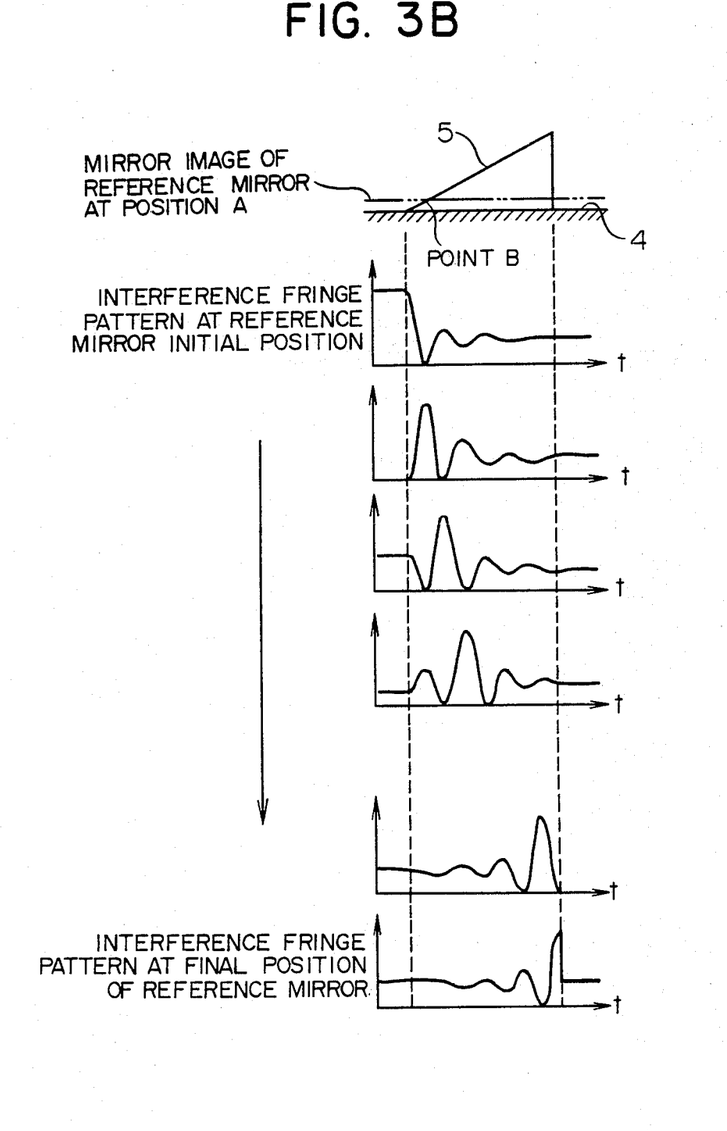
FIG. 3B is a characteristic diagram showing the relation between the position of a reference mirror and the pattern of interference fringes.
Figure 4:
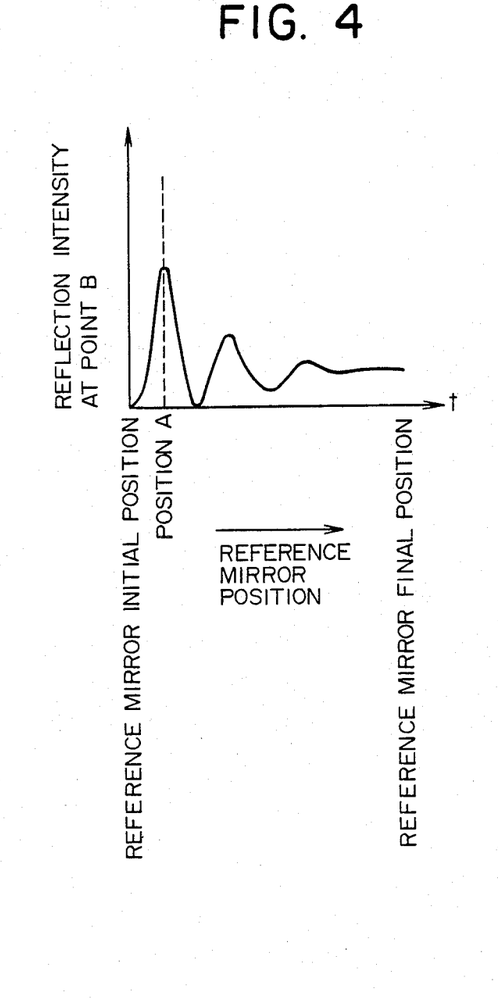
FIG. 4 is a characteristic diagram showing variations in the reflection intensity at a point B with the movement of the reference mirror.

Before describing an embodiment of the invention, the measuring principle of the invention will now be described with reference to FIGS. 3A, 3B and 4. FIG. 3A is a schematic diagram for explaining the measuring principle of this invention, and FIG. 3B is a characteristic diagram showing the relation between the reference mirror position and the interference fringe pattern. FIG. 4 is a characteristic diagram showing variations of the reflection intensity at a point B (see FIG. 3A) due to the movement of the reference mirror. In FIG. 3A, numeral 1 designates an interference microscope including a light source 2, a half mirror 3, a mount 4, a specimen 5, a reference mirror 6 and an objective mirror 7. Numeral 9 designates a television camera, 9a a television monitor, and 14 an image composing circuit.

When the surface of the specimen 5 is observed by the television camera 9 by use of the interference microscope 1, interference fringes due to the difference in optical length between the irregularities in the surface of the specimen and the reference mirror 6 are observed.

At this time, if the light source 2 is one having a poor coherency, the resulting interference fringes form a pattern such that the contrast becomes maximum at the position where the difference in optical path length between the specimen surface and the reference mirror surface is reduced to zero and the contrast is rapidly attenuated with increase in the optical path length difference.

As a result, if the reference mirror 6 is moved relative to the specimen 5 having a triangular shape in section as shown in FIG. 3A, as shown by the changes of the interference fringe pattern in FIG. 3B, the manner in which the point of the maximum interference fringe contrast is shifted gradually is observed.

At this time, noting a point, e.g., the point B on the specimen surface, as the reference mirror 6 is moved, the reflection intensity at the point B varies as shown in FIG. 4 so that the reflection brightness becomes maximum when the reference mirror 6 arrives at a position A where its mirror image passes through the point B.

This phenomenon means that while scanning the reference mirror 6 in the direction of the optical path to observe the reflection intensity at each of all the points in the field of view from moment to moment, if the image composing circuit 14 performs an image composing processing such that the value of each point is represented by the position of the reference mirror 6 at which the reflection intensity has the maximum value, the three-dimensional profile of the object to be measured can be measured as a pattern.

Figure 5:
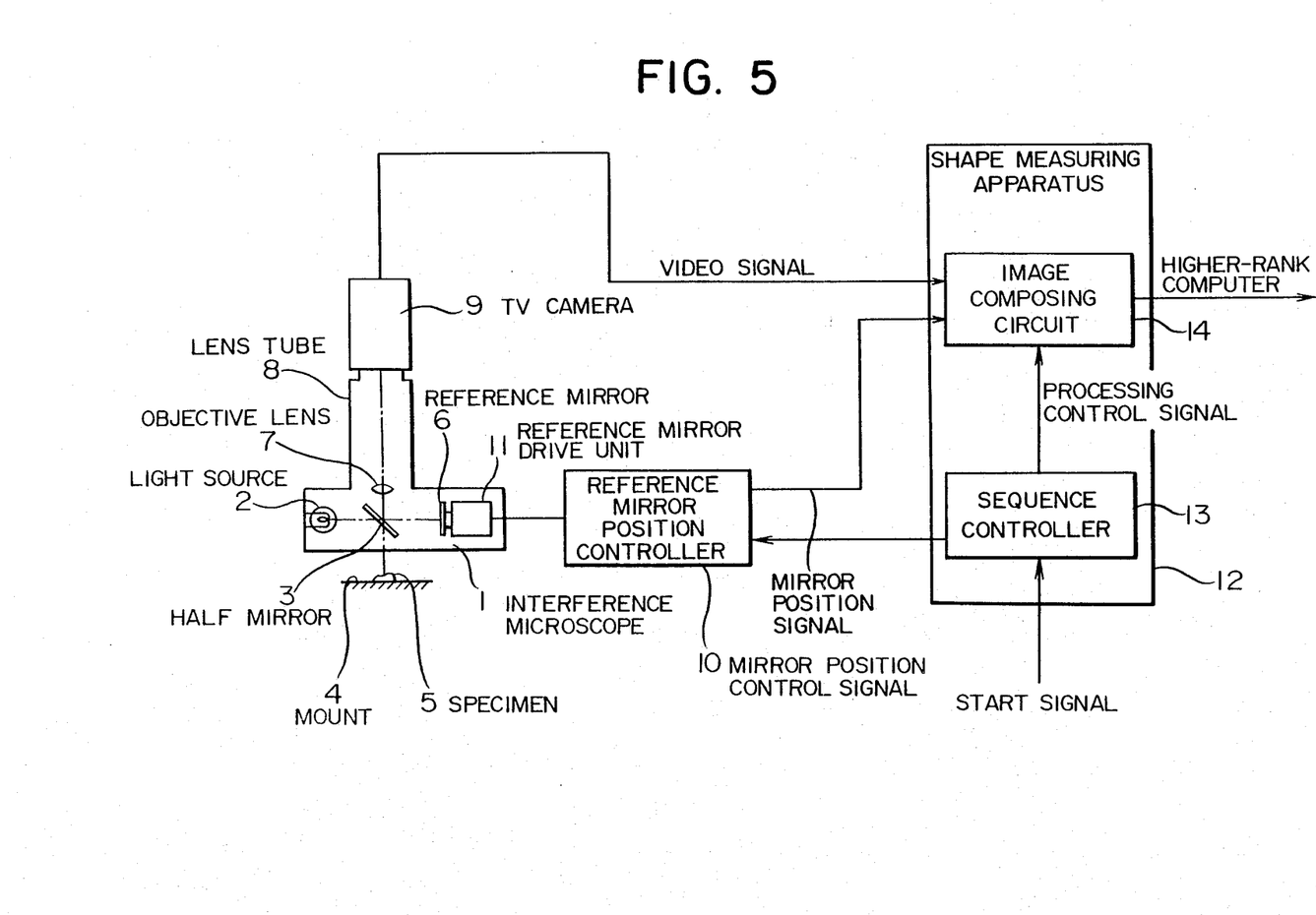
FIG. 5 is a block diagram showing a three-dimensional curved surface shape measuring apparatus according to an embodiment of the invention.
Figure 6:
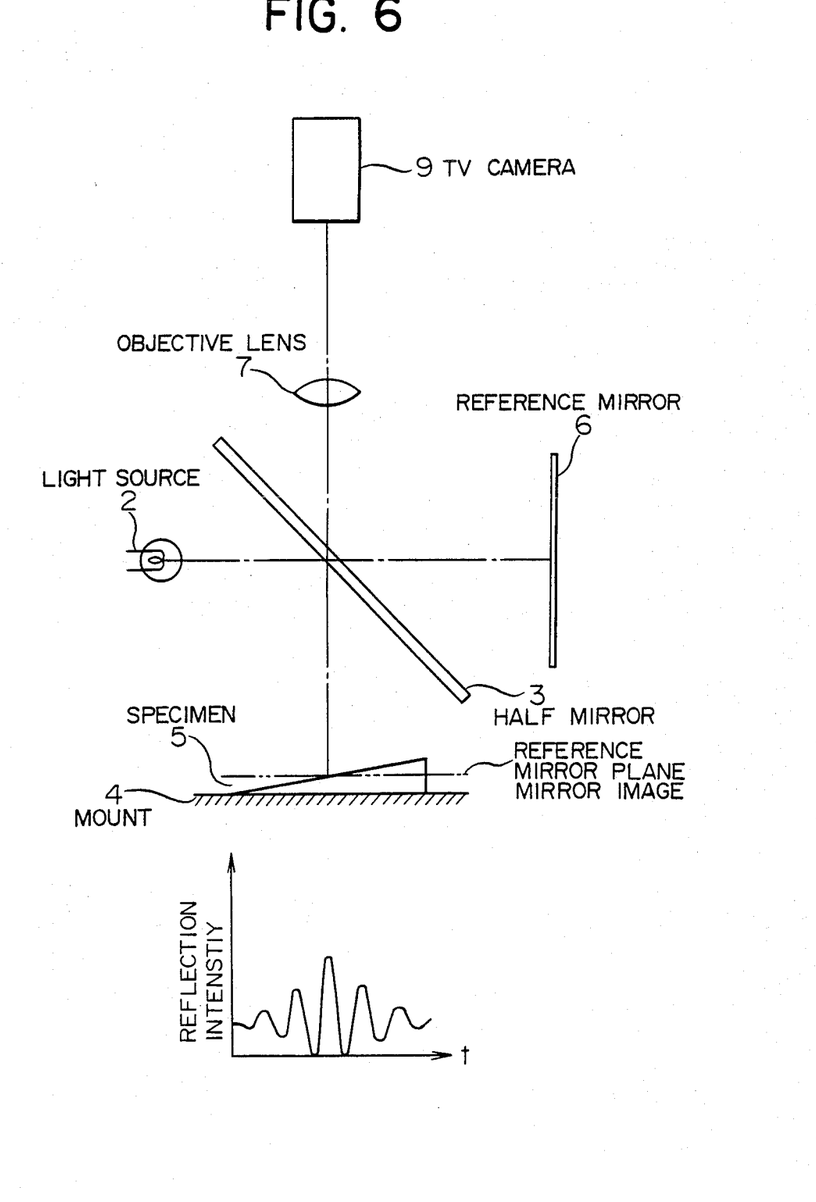
FIG. 6 is a schematic diagram showing the light interference system in the apparatus of FIG. 5.
Figure 7:
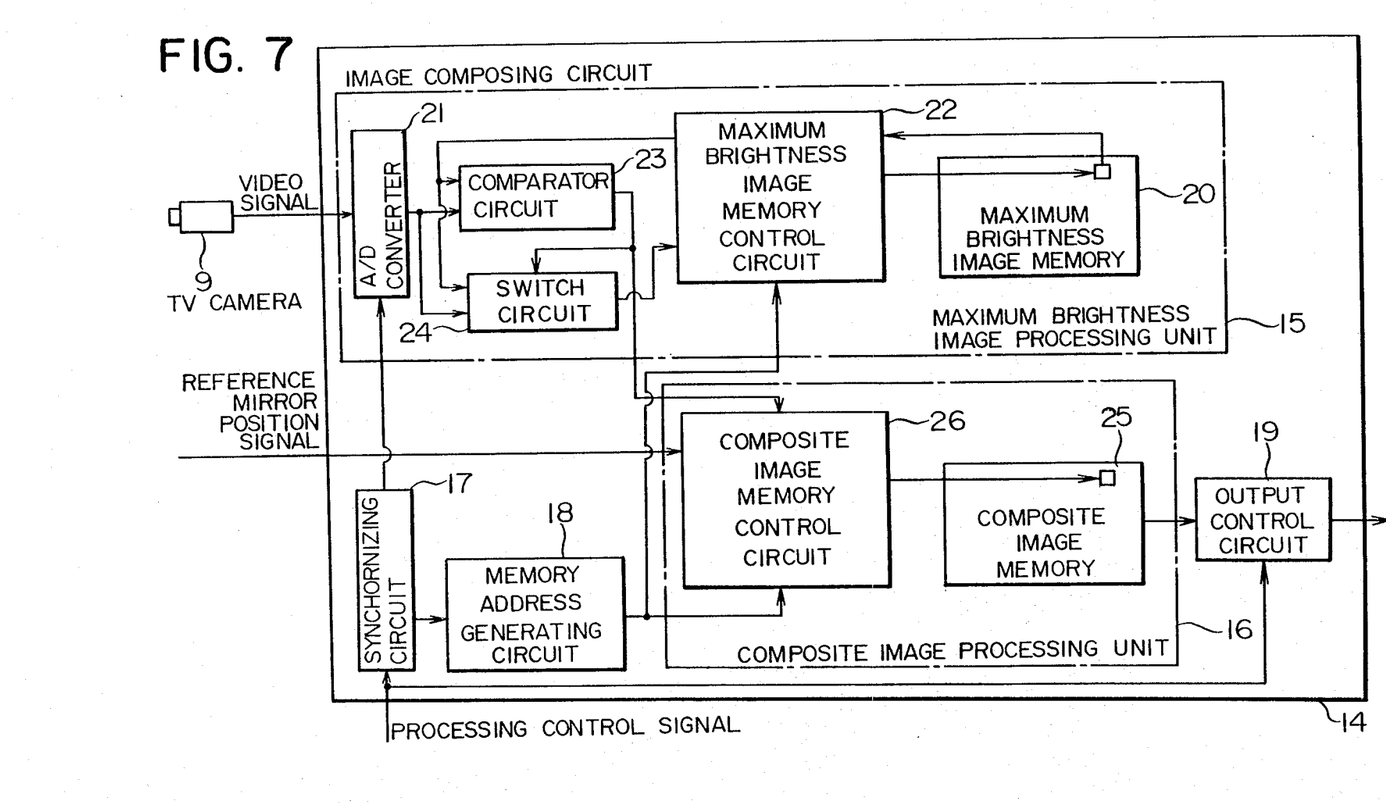
FIG. 7 is a block diagram showing an example of the image composing circuit in FIG. 5.

Next, an embodiment of the invention will be described with reference to the drawings. FIG. 5 is a block diagram showing a three-dimensional curved surface shape measuring apparatus according to the embodiment of the invention and FIG. 6 is a schematic diagram for explaining the interference optical system in FIG. 5. FIG. 7 is a block diagram of the image composing circuit in FIG. 5.

In FIG. 5, the light emitted from the light source 2 of the microscope 1 is divided into two parts by the half mirror 3 so that after these beams have been respectively reflected by the surface of specimen 5 placed on the mount 4 and the reference mirror 6, the reflected beams of light are again superimposed one upon another at the half mirror 3 and focussed by the objective lens 7 on the image pickup surface of the television camera 9 through the lens tube 8.

At this time, the two beams of light interfere with each other so that interference fringes of a $\lambda/2$ ($\lambda$=wavelength of light) pitch are produced in accordance with the difference in optical path length between the surface of the specimen 5 and the plane of the reference mirror 6. In particular, this embodiment employs light of inferior coherency as the light source 2 so as to produce an interference fringe pattern such that as for example, the light intensity of the interference fringes becomes maximum at the position where the difference in optical path length between the surface of the specimen 5 and the plane of the reference mirror 6 is reduced to zero and the contrast of the interference fringes is rapidly attenuated with increase in the optical path length difference as shown in FIG. 4.

The reference mirror 6 is arranged so that it makes a parallel movement in the optical axis direction through a reference mirror driving mechanism 11 which is controlled by a reference mirror position controller 10. Thus, when the visual field of the microscope is observed by the television camera 9 while moving the reference mirror 6 by the reference mirror driving mechanism 11, as with the characteristic diagram of FIG. 3B, the manner in which the interference fringe pattern equivalent to contour lines is gradually moved in the height direction on the specimen 5 is observed.

A shape measuring apparatus 12 is designed so that the scanning of the reference mirror 6 is controlled through the reference mirror position controller 10 and simultaneously the shape of the specimen is measured in accordance with the video signal generated from the television camera 9 and the reference mirror position signals generated from the reference mirror position controller 10. The apparatus 12 includes a sequence controller 13 for controlling the sequence of measuring operations and an image composing circuit 14 which will be described later and it has a function so that the video signal generated from the television camera 9 while scanning the reference mirror 6 is processed from moment to moment to form a composite image in which the value of each of picture elements in the image is represented by the position of the reference mirror 6 at instant that the point corresponding to that picture element has the maximum brightness.

When making the measurement, in response to a start signal applied externally the sequence controller 13 applies a command to the reference mirror position controller 10 to set the reference mirror 6 in the initial position. When this occurs, the reference mirror position controller 10 sets the reference mirror 6 in the initial position through the reference mirror driving mechanism 11 and it also resets the mirror position signal to zero.

Thereafter, the sequence controller 13 applies a drive start command to the reference mirror position controller 10 and it also applies a processing start command to the image composing circuit 14. Consequently, the reference mirror driving mechanism 11 scans the reference mirror 6 over such a range that there always occurs a moment at which the difference in optical path length between the specimen 5 and the reference mirror 6 is reduced to zero with respect to each of all the shape measuring points on the surface of the specimen 5. Simultaneously with the start of the scanning of the reference mirror 6, the image composing circuit 14 begins the processing of the video signal generated from the television camera 9 so that the previously mentioned image composing processing is performed during the time that the reference mirror 6 is scanned.

When the scanning of the reference mirror 6 over the given range is completed, the image composing circuit 14 completes the processing in response to the command from the sequence controller 13. At this time, the data corresponding to the three-dimensional profile of the specimen 5 is stored in the memory of the image composing circuit 14 and the data is suitably transferred to a higher-rank computer is response to the command therefrom.

An embodiment of the image composing circuit 14 forming a constitutional element of the above-described shape measuring apparatus 12 will now be described with reference to FIG. 7.

The image composing circuit 14 includes a maximum brightness image processing unit 15 for processing the video signal applied from the television camera 9 to compute the brightness of the instant that it becomes brightest for each of the picture elements, and a composite image processing unit 16 for performing an image composing processing in a manner that the value of each picture element is represented by the reference mirror position signal at the instant that the picture element has the maximum brightness in time. It also included, for purposes of controlling the former circuits, a synchronizing circuit 17, a memory address generating circuit 18 and an output control circuit 19.

The maximum brightness image processing unit 15 includes mainly a maximum brightness image memory 20 comprising a buffer memory for maximum brightness image processing purposes as well as an A/D converter circuit 21 responsive to the timing signals generated from the synchronizing circuit 17 to digitize the video signal by A/D conversion, a maximum brightness image memory control circuit 22 for controlling the reading and writing of data into the maximum brightness image memory addresses designated by the memory address generating circuit 18, a comparator circuit 23 for comparing the signal level of the image applied from the television camera 9 with the value of each picture element in the corresponding address of the maximum brightness image memory 20 to select an output greater-valued one of the two, and a switch circuit 24.

On the other hand, the composite image processing unit 16 includes mainly a composite image memory 25 for storing the results of composite image processing as well as a composite image memory control circuit 26 having a function of responding to the output signal from the comparator circuit 23 of the maximum brightness image processing unit 15 so that when the input signal from the television camera 9 is greater than the value of the picture element at the corresponding address of the maximum brightness image memory 20, the current reference mirror position signal is written into the composite image memory 28.

The image composing circuit 14 starts at the timing of beginning of the processing with the maximum brightness image memory 20 and the composite memory 25 being cleared to zero, so that while digitizing the video signal applied from the television camera 9 by the A/D converter circuit 21, the value of the video signal or the value of each of the picture elements is compared with the value of that picture element in the maximum brightness image memory 20 which corresponds to the position of the former picture element so that only when the value of the video signal is greater, the value of the picture element in the maximum brightness image memory 20 is updated by the value of the video signal and simultaneously the reference mirror position signal is written into the corresponding picture element of the composite image.

In this way, during the period of time that is commanded by the externally applied processing control signal, the above-mentioned processing is performed so that the previously mentioned desired image is formed in the composite image memory 25 upon the completion of the processing. The thus processed composite image is transferred to the following processing circuit or a higher-rank computer through the output control circuit 19.

While the above-described embodiment shows an example of the apparatus constructed on the basis of a Michelson-type interference microscope, as will be seen readily, the principle of the invention is also applicable to any other interference microscope such as the Mirau type or Linnik type, and also it is needless to say that the same principle holds by moving the mount 4 in the direction of the optical axis to scan the surface of a specimen instead of scanning the reference mirror and that the invention is not necessarily limited to the optical system of the above-described embodiment. In addition, the invention is applicable to any interferometer employing no microscope.

Further, while the above-described embodiment is constructed so as to perform the image composing which codes the positions of the reference mirror, any quantities can be effectively coded provided that these quantities are equivalent to the positions of the reference mirror. For instance, it is possible to arrange so that under the presumption that the reference mirror is scanned at a constant speed, a composite image coded by the times after the start of the scanning is formed first and after the completion of the scanning the composite image is converted to values corresponding to the positions of the reference mirror on the basis of the scanning speed by a separate processing circuit following the image composing circuit 14 in the shape measuring apparatus 12, thereby measuring the shape of a specimen.

What is claimed is:

1. A method of measuring a three-dimensional curved surface shape comprising the steps of:

producing interference fringes on a surface of an object to be measured in accordance with a difference in optical path length between the surface of said object to be measured and a reference plane;

measuring a position of said reference plane or of a reference surface of said object to be measured in the direction of an optical path or a quantity equivalent to said position while moving said reference plane or said object in said optical axis direction;

picking up a pattern of said interference fringes produced on the surface of said object to be measured;

processing from moment to moment a video signal generated by picking up the surface of said object to be measured to form a composite image in which a value of each of picture elements is represented by a position of said reference plane or said object reference surface in said optical axis direction or a quantity equivalent thereto at an instant that one of positions on said object surface corresponding to each said picture element attains a maximum brightness; and measuring a three-dimensional curved surface shape of said object to be measured in accordance with said composite image.

2. An apparatus for measuring a three-dimensional curved surface shape comprising:

interference fringe generating means for producing interference fringes on a surface of an object to be measured in accordance with a difference in optical path length between the surface of said object to be measured and a reference plane:

scanning means for moving said reference plane or said object to be measured in the direction of an optical axis;

position measuring means for measuring a position of said reference plane or of a reference surface of said object to be measured in said optical axis direction or a quantity equipment thereto;

image pickup means for picking up a pattern of said interference fringes produced on the surface of said object to be measured; and image composing means for processing from moment to moment a video signal generated from said image pick means to form a composite image in which a value of each of picture elements is represented by a position of said reference plane or said object reference surface in said optical path direction or a quantity equivalent thereto at an instant that one of positions on said object surface corresponding to each said picture element attains a maximum brightness, whereby a three-dimensional curved surface shape of said object to be measured is measured by performing a computational processing on the basis of said composite image formed by said image composing means.

3. An apparatus according to claim 2, wherein said image composing means comprises:

maximum brightness image memory means for storing a maximum level of said video signal for each of picture elements thereof within said predetermined period of time;

maximum brightness processing means for comparing said video signal and a signal stored in said maximum brightness image memory means with respect to each corresponding picture elements thereof to write greater-valued one thereof into said maximum brightness image memory means;

composite image memory means for storing for each of said picture elements a count of synchronizing signals or a value of one said external input signals at an instant that said video signal attains the highest level during said predetermined period of time; and composite image processing means whereby for each said picture element for which said maximum brightness image processing means determines that said video signal is greater than said signal stored in said maximum brightness image memory means, a count value of synchronizing signals or a value of one of said external input signals at the instant of said determination is written into said composite image memory means.

4. An apparatus according to claim 2, wherein said interference fringe generating means comprises an interference microscope.

5. An apparatus according to claim 3, wherein said interference fringe generating means includes a source of light having an inferior coherency.

* * * * *